United States Patent
Aiken et al.

(10) Patent No.: US 8,798,805 B2
(45) Date of Patent: Aug. 5, 2014

(54) ELECTRIC VEHICLE CHARGING STATION REMOTE DISCONNECT SYSTEM

(75) Inventors: Brian Matthew Aiken, Atlanta, GA (US); Christopher Charles Yasko, Milton, GA (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 13/191,674

(22) Filed: Jul. 27, 2011

(65) Prior Publication Data

US 2013/0030594 A1 Jan. 31, 2013

(51) Int. Cl.
*G06F 1/26* (2006.01)

(52) U.S. Cl.
USPC .............................. 700/297; 700/295; 702/61

(58) Field of Classification Search
USPC ............. 700/295, 297, 298; 702/61; 705/412; 320/108, 109, 128, 137; 307/25, 48
See application file for complete search history.

(56) References Cited

U.S. PATENT DOCUMENTS

| | | | |
|---|---|---|---|
| 6,081,205 A | 6/2000 | Williams | |
| 7,545,135 B2 | 6/2009 | Holle et al. | |
| 7,561,681 B2 | 7/2009 | Booth et al. | |
| 7,746,624 B2 | 6/2010 | Rispoli et al. | |
| 7,928,598 B2* | 4/2011 | King et al. | 307/9.1 |
| 8,154,151 B2* | 4/2012 | King et al. | 307/9.1 |
| 8,154,246 B1* | 4/2012 | Heitmann | 320/109 |
| 8,330,293 B2* | 12/2012 | Brown et al. | 307/48 |
| 8,478,452 B2* | 7/2013 | Pratt et al. | 700/297 |
| 2009/0210357 A1* | 8/2009 | Pudar et al. | 705/412 |
| 2009/0259603 A1* | 10/2009 | Housh et al. | 705/412 |
| 2010/0045232 A1* | 2/2010 | Chen et al. | 320/109 |
| 2011/0245987 A1* | 10/2011 | Pratt et al. | 700/295 |
| 2011/0248567 A1* | 10/2011 | Brown et al. | 307/48 |
| 2012/0025759 A1* | 2/2012 | Kressner | 320/108 |
| 2012/0131100 A1* | 5/2012 | Van Olst et al. | 709/204 |
| 2012/0131360 A1* | 5/2012 | Zyren et al. | 713/310 |
| 2012/0265362 A1* | 10/2012 | Yasko | 700/297 |
| 2012/0265459 A1* | 10/2012 | Sfaelos | 702/61 |
| 2012/0268247 A1* | 10/2012 | Boot et al. | 340/5.83 |
| 2012/0274440 A1* | 11/2012 | Meadows et al. | 340/3.42 |
| 2012/0310433 A1* | 12/2012 | Littrell | 700/297 |

* cited by examiner

*Primary Examiner* — Charles Kasenge
(74) *Attorney, Agent, or Firm* — Hoffman Warnick LLC; Ernest G. Cusick

(57) ABSTRACT

Aspects of the invention provide for an electric vehicle charging station (EVCS). In one embodiment, the EVCS may include: a charging outlet configured to receive a chargeable device; a contactor operably connected to the charging outlet and electrically connected to an advanced metering infrastructure (AMI) meter; and an EVCS controller configured to receive a set of instructions from the AMI meter about modifying an amount of power supplied to the charging outlet, wherein the EVCS controller is configured to modify the amount of power supplied to the charging outlet via the contactor in response to receiving the set of instructions.

4 Claims, 2 Drawing Sheets

ELECTRIC VEHICLE CHARGING STATION REMOTE DISCONNECT SYSTEM

BACKGROUND OF THE INVENTION

The subject matter disclosed herein relates to a remote disconnect system for an electric vehicle charging station. Specifically, the subject matter disclosed herein relates to system utilizing a charge coupler interruption device (CCID) for remote disconnection of an electrical vehicle charging station (EVCS).

Control of power supplied to an EVCS is often effectuated by a myriad of relays and separate switches. These relays and separate switches may make it difficult to efficiently control the power supply to a particular EVCS as desired. Additionally, current EVCS systems may fail to meet specifications for certification authorities without major modification to the EVCS components and connections.

BRIEF DESCRIPTION OF THE INVENTION

Aspects of the invention provide for an electric vehicle charging station (EVCS). In one embodiment, the EVCS may include: a charging outlet configured to receive a chargeable device; a contactor operably connected to the charging outlet and electrically connected to an advanced metering infrastructure (AMI) meter; and an EVCS controller configured to receive a set of instructions from the AMI meter about modifying an amount of power supplied to the charging outlet, wherein the EVCS controller is configured to modify the amount of power supplied to the charging outlet via the contactor in response to receiving the set of instructions.

A first aspect of the invention includes an electric vehicle charging station (EVCS) having: a charging outlet configured to receive a chargeable device; a contactor operably connected to the charging outlet and electrically connected to an advanced metering infrastructure (AMI) meter; and an EVCS controller configured to receive a set of instructions from the AMI meter about modifying an amount of power supplied to the charging outlet, wherein the EVCS controller is configured to modify the amount of power supplied to the charging outlet via the contactor in response to receiving the set of instructions.

A second aspect of the invention includes a system having: at least one computing device configured to remotely disconnect an electrical vehicle charging station (EVCS) connected to an electrical communications network by performing actions including: obtaining a set of instructions over the electrical communications network for terminating power supplied to a charging outlet of the EVCS; and commanding a contactor in the EVCS to terminate the power supplied to the charging outlet in response to the obtaining of the set of instructions.

A third aspect of the invention includes a program product stored on a computer readable medium, which when executed by at least one computing device, performs the following: obtains a set of instructions over the electrical network for terminating power supplied to a charging outlet of the EVCS; and commands a contactor in the EVCS to terminate the power supplied to the charging outlet in response to the obtaining of the set of instructions.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
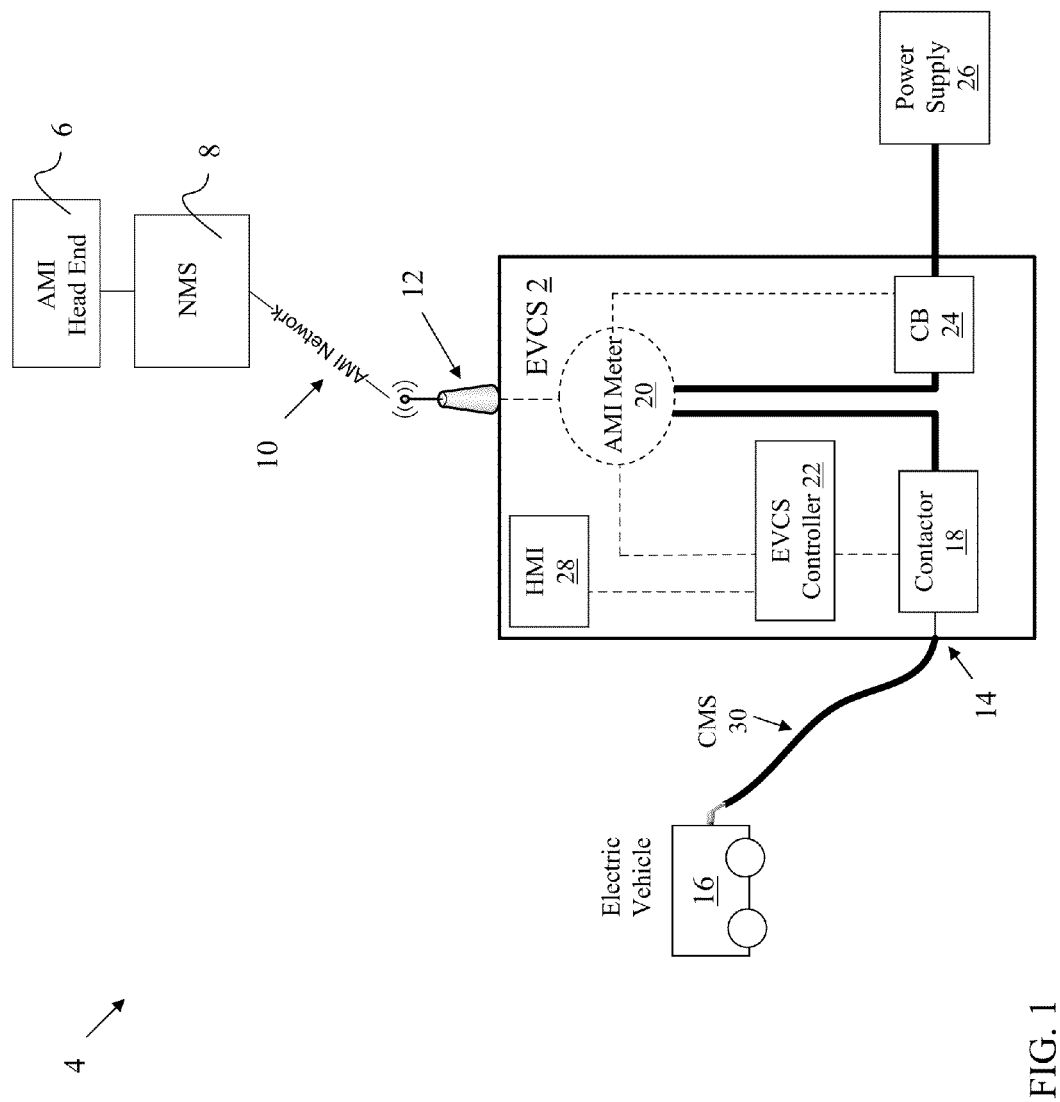
FIG. 1 shows an illustrative environment including an electric vehicle charging station according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to a remote disconnect system for an electric vehicle charging station. Specifically, the subject matter disclosed herein relates to a system utilizing a charging circuit interrupting device (CCID) for remote disconnection of an electrical vehicle charging station (EVCS).

Generally, aspects of the invention are directed toward load control over an electrical network. EVCSs are connected to that electrical network at nodes, where each EVCS is a relatively "heavy" load device, drawing approximately 15-20 Amps (AC Level 1 Charger, 1.9 kW), or up to 80 Amps (AC Level Charger 2, 19 kW), or more for DC Fast Charging (100 kW), during operation. Control of power supplied to an EVCS is often effectuated by a myriad of relays and separate switches. These relays and separate switches may make it difficult to efficiently control the power supply to a particular EVCS as desired. Additionally, current EVCS systems may fail to meet specifications for certification authorities without major modification to the EVCS components and connections.

In general, electric infrastructure equipment owned by a utility company is not subject to consumer safety certification. EVCSs require certification with a certification authority (e.g., an independent certification authority) before these stations may be implemented as a publicly-accessible vehicle charging station. Conventionally, in order for an EVCS to meet its certification requirement, the EVCS needs to contain certified components (e.g., relays and switches), which contribute to increases in both the cost and the size of the EVCS.

In contrast to these conventional EVCS systems, aspects of the invention are directed toward systems and computer program products configured to effectuate a remote disconnect function in an EVCS. The remote disconnect function in the conventional systems is typically a hardware contactor relay tightly integrated with the AMI metering component. The EVCS systems disclosed according to aspects of the invention utilize a shared contactor relay (e.g., a relay charging circuit interrupting device (CCID)) controllable via an EVCS controller (having a remote disconnect software module). That is, the EVCS systems disclosed according to aspects of the invention utilize a bi-functional (or, dual-purpose) contactor configured to act as a relay for the AMI metering component, as well as a remote disconnect switch. The system, therefore, utilizes a software-based command infrastructure to reduce the hardware components contained within the EVCS, ultimately contributing to an affordable and certifiable solution to the remote disconnect problem.

One aspect of the invention includes an electric vehicle charging station (EVCS). Turning to FIG. 1, an embodiment of an EVCS 2 is shown within an environment 4. The environment 4 may include a conventional advance metering infrastructure (AMI) head end 6, which is linked (e.g., wirelessly or via hard-wired means) with a conventional network management system (NMS) 8. As is known in the art, the NMS 8 may be designed to configure and control distributions to a plurality of devices across an electrical network. Further explanation of the functions of the NMS 8 are omitted herein for clarity. The NMS 8 is connected to the EVCS 2 via a conventional AMI network 10 (and corresponding receiver 12), which may be a wireless and/or hardwired network (and corresponding receiver 12). In one embodiment, the AMI network 10 may be a wireless 3G network, as is known in the art. The EVCS 2 may include a charging outlet 14 (depicted including a charging cable) (or, charging management system, CMS 30) configured to electrically connect to an electric vehicle 16 and provide a power supply to that vehicle 16 (e.g., for the purposes of charging the vehicle's batteries). Also shown, EVCS 2 may include a contactor 18 operably (e.g., electrically) connected to the charging outlet 14 and electrically connected to an advanced metering infrastructure (AMI) meter 20, shown optionally in this embodiment. It is understood that aspects of the invention may include implementation of the AMI meter 20 within the EVCS 2, however, other embodiments may perform the functions described herein without implementation of the AMI meter 20 within the EVCS 2. These aspects are further explained with reference to the EVCS controller (e.g., a physical control board and/or a software implementation) 22. As shown, the EVCS 2 may include an EVCS controller 22 configured to receive a first set of instructions from the AMI meter 20 (which may be located within, or external to, to EVCS 2. The first set of instructions from the AMI meter 20 may provide details as to how a power supply to the charging outlet 14 should be modified. For example, the first set of instructions may be transmitted via the AMI network 10 (e.g., from the NMS 8) and may indicate that the power supply to the charging outlet 14 should be terminated (e.g., immediately). In other cases, the first set of instructions may indicate that an amount of power supplied to the charging outlet 14 should be modified (e.g. reduced by specified percentage). In other cases, the first set of instructions may indicate that power supplied to the charging outlet 14 should be modified after an AMI event (e.g., reinstated after payment of an amount due). Also shown included in the EVCS 2 is a circuit breaker (CB) 24 electrically connected to the AMI meter 20 and a power source (or, power supply) 26 such as an AC power supply powering the EVCS 2. The circuit breaker 24 is configured to provide a safety function when excessive electrical current is detected. The EVCS 2 may further include a conventional human-machine interface (or, HMI) 28, which may include one or more interfaces allowing a human (e.g., an operator or technician) to interact with the EVCS 2 and control one or more functions (e.g., drawing electricity, providing payment, etc.).

In practice, in response to receiving the first set of instructions (from the AMI meter 20) to modify the amount of power supplied to the charging outlet 14, the EVCS controller 22 may modify the amount of power supplied to the charging outlet 14 via actuation of the contactor (or, relay) 18. That is, the EVCS 22 may provide a second set of instructions to the contactor 18 to disconnect the power supplied via the circuit breaker 24 and the AMI meter 20 to the charging outlet 14 in response receiving the first set of instructions from the AMI meter 20. In one embodiment, the first set of instructions can be communicated across a networking interface (e.g. RS232, RS485, RS422, G.703, C37.94) and using an industry standard protocol (e.g., Ethernet, Modbus, DNP, IEC61850) or a proprietary protocol. The second set of instructions can be in a similar or distinct protocol (e.g., Ethernet, Modbus, DNP, IEC61850, or a proprietary protocol) from the protocol of the first set of instructions. That is, the EVCS controller 22 interprets the first set of instructions using the first communications protocol, and is configured to provide the second set of instructions to the contactor 18 using the second, communications protocol.

As shown in EVCS 2, the contactor 18 may act as a single relay for the charging outlet 14, such that it centrally controls the power supply to the charging outlet 14 (both for electrical vehicle general supply and utility commanded remote disconnect). That is, the contactor 18 may act as a shared relay for both the power supply function of the EVCS 2 and the remote disconnect function, which may be effectuated by the EVCS controller 22. This allows the EVCS 2 to execute a remote disconnect function at the charging outlet 14 without the need to implement an additional relay/switch.

Additionally, as noted herein, EVCS 2 allows for removal of the conventional relay hardware from the AMI meter 20, where the AMI meter 20 in the EVCS 2 utilizes the shared contactor 18 as its relay. This shared contactor configuration not only allows for reduced system costs as compared to the conventional configuration (e.g., where one fewer relay hardware component is required), but the EVCS 2 disclosed according to embodiments of the invention also substantially reduces the burden of certifying the charging station. That is, reduction in hardware components as compared to the conventional configuration allows the EVCS 2 to meet lower (or, easier) certification standards. This can be true because the EVCS 2 disclosed according to embodiments of the invention implements an at least partially software-based control system (e.g., EVCS controller 22), which eliminates the hardware-based relay from the AMI meter 20.

As will be appreciated by one skilled in the art, the EVCS controller described herein may be embodied as a system(s), method(s) or computer program product(s), e.g., as part of an EVCS controller(s). Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Magik, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to data flow illustrations and/or block diagrams of methods, apparatus (systems) and computer program products according to embodiments of the invention. It will be understood that each block of the data flow illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
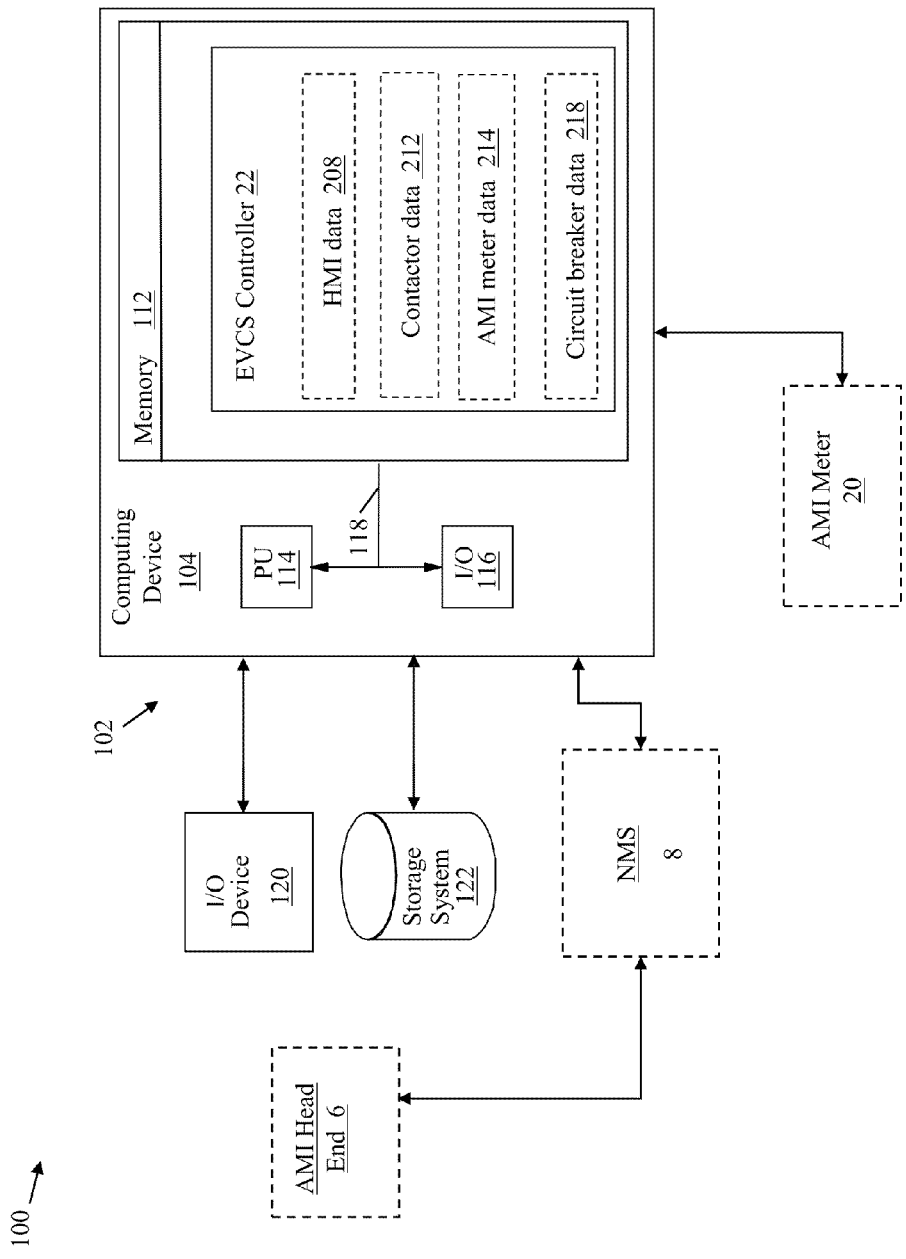
FIG. 2 shows an illustrative environment including an electric vehicle charging station controller according to embodiments of the invention.

Turning to FIG. 2, an illustrative environment 100 including an EVCS controller 22 is shown according to embodiments of the invention. Environment 100 includes a computer infrastructure 102 that can perform the various processes described herein. In particular, computer infrastructure 102 is shown including a computing device 104 that comprises the EVCS controller 22, which enables computing device 104 to implement a remote disconnect function at an EVCS 2 (FIG. 1). It is understood that the EVCS controller 22 shown and described herein may take the form of a strictly hardware component, a strictly software component, or a combination of hardware and software components. In some cases, the EVCS controller 22 can include a microprocessor and a memory, however, many configurations are possible to achieve the functions described herein.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as EVCS controller 22, which is stored in memory 112 and/or storage system 122. While executing computer program code, processor 114 can read and/or write data, such as HMI data 208 (e.g., data transmitted to/received from the HMI 28), contactor data 212 (e.g., data transmitted to/received from contactor 18), AMI meter data 214 (e.g., data transmitted to/received from the AMI meter 20) and/or circuit breaker data 218 (e.g., data transmitted to/received from the circuit breaker 24), to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In some embodiments, as shown in FIG. 2, environment 100 may optionally include a conventional network management system 8, connected with the AMI head end 6, and an AMI meter 20, each of which may be operably connected (e.g., via wireless or hard-wired means) to the EVCS controller 22 through computing device 104, which may be contained within an EVCS 2. In some embodiments, these components may be linked with one another (e.g., via wireless or hard-wired means). It is understood that EVCS controller 22 may include conventional transmitters and receivers for transmitting and receiving, respectively, data from the NMS 8 and/or the AMI meter 20.

In any event, computing device 104 can comprise any general purpose computing article of manufacture capable of executing computer program code installed by a user (e.g., a personal computer, server, handheld device, etc.). However, it is understood that computing device 104 and EVCS controller 22 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, EVCS controller 22 has the technical effect of enabling computing infrastructure 102 to perform, among other things, remote disconnect functions described herein. It is understood that some of the various components shown in FIG. 2 can be implemented independently, combined, and/or stored in memory for one or more separate computing devices that are included in computer infrastructure 102. Further, it is understood that some of the components and/or functionality may not be implemented, or additional schemas and/or functionality may be included as part of environment 100.

The data flow diagram and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., voltage, current, temperatures, grid frequency, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric vehicle charging station (EVCS) comprising:
    a charging outlet configured to receive a chargeable device;
    a contactor operably connected to the charging outlet and electrically connected to an advanced metering infrastructure (AMI) meter, the AMI meter substantially contained within a housing of the EVCS; and
    an EVCS controller configured to receive a first set of instructions from the AMI meter about modifying an amount of power supplied to the charging outlet,
    wherein the EVCS controller is configured to modify the amount of power supplied to the charging outlet via the contactor in response to receiving the first set of instructions, and
    wherein the AMI meter is configured to receive a second set of instructions via an AMI network external to the EVCS, and
    wherein the contactor is a bi-functional contactor configured to provide a remote disconnect function for the AMI meter in response to receiving the second set of instructions.

2. The EVCS of claim 1, wherein the contactor acts as a single relay for the charging outlet.

3. The EVCS of claim 1, wherein the contactor acts as a shared relay in the EVCS.

4. The EVCS of claim 1, further comprising a human-machine infrastructure (HMI).

* * * * *

UNITED STATES PATENT AND TRADEMARK OFFICE
CERTIFICATE OF CORRECTION

PATENT NO.        : 8,798,805 B2  
APPLICATION NO.   : 13/191674  
DATED             : August 5, 2014  
INVENTOR(S)       : Aiken et al.

Page 1 of 1

It is certified that error appears in the above-identified patent and that said Letters Patent is hereby corrected as shown below:

In the Specification

In Column 3, Line 60, delete "EVCS 22" and insert -- EVCS 2 --, therefor.

Signed and Sealed this
Twelfth Day of May, 2015

Michelle K. Lee
*Director of the United States Patent and Trademark Office*